United States Patent [19]

Fajt

[11] Patent Number: 5,525,353

[45] Date of Patent: Jun. 11, 1996

[54] AMBIENT TEMPERATURE-PROCESSED AQUATIC ANIMAL FEED AND PROCESS FOR MAKING SAME

[75] Inventor: James R. Fajt, Auburn, Ala.

[73] Assignee: Aquacenter, Inc., Leland, Miss.

[21] Appl. No.: 231,089

[22] Filed: Apr. 22, 1994

[51] Int. Cl.[6] ............................................. A23L 1/0532
[52] U.S. Cl. .......................... 424/442; 424/499; 424/817; 424/827; 426/72; 426/74; 426/250; 426/573; 426/635; 426/656; 426/658; 426/805
[58] Field of Search ................................ 424/442, 499, 424/827, 817; 426/72, 74, 573, 635, 658, 805, 250, 656, 635

[56] References Cited

U.S. PATENT DOCUMENTS

| | | | |
|---|---|---|---|
| 3,862,336 | 1/1975 | Kofsky et al. | 426/1 |
| 3,889,007 | 6/1975 | Gunter et al. | 426/1 |
| 4,153,735 | 5/1979 | Mommer | 426/285 |
| 4,597,969 | 7/1986 | Maxfield et al. | 424/157 |
| 4,713,245 | 12/1987 | Ando et al. | 424/438 |
| 4,713,251 | 12/1987 | Seighman | 426/96 |
| 4,844,936 | 7/1989 | Cox et al. | 426/549 |
| 4,935,250 | 6/1990 | Cox | 426/94 |
| 5,006,361 | 4/1991 | Cox | 426/601 |
| 5,161,481 | 11/1992 | Laufer | 119/2 |
| 5,169,634 | 12/1992 | Ellingsen et al. | 424/442 |
| 5,250,307 | 10/1993 | Cummings et al. | 426/72 |

*Primary Examiner*—Brain M. Burn
*Attorney, Agent, or Firm*—Pennie & Edmonds

[57] ABSTRACT

This invention relates broadly to a novel ambient-temperature process for making aquatic animal feed including fish and crustaceans and to the aquatic animal feed so produced.

7 Claims, No Drawings

AMBIENT TEMPERATURE-PROCESSED AQUATIC ANIMAL FEED AND PROCESS FOR MAKING SAME

FIELD OF THE INVENTION

This invention relates broadly to a novel ambient-temperature process for making aquatic animal feed including fish and crustaceans and to the aquatic animal feed so produced.

BACKGROUND OF THE INVENTION

There is considerable waste of fish food supplied for feeding fish in rearing tanks, ponds in fish hatcheries and fisheries and in aquaculture fields due to undesirable characteristics of commercial fish food. Early experiments comparing meal to pelleted type feed demonstrated that many finfish utilize pelleted feed more efficiently. Many of the small meal particles were not ingested, resulting in poorer feed conversion and decreased water stability resulting in reduced water quality. This did and continues to create an unsuitable and unhealthy environment for the desired aquatic organism. To minimize these undesirable effects, many commercial feeds are processed into pellets.

However, many disadvantages exist in the pelleted feed commercially available. One major disadvantage of the commercially available feed is the high temperatures and pressures used during conventional screw-type extrusion mill processing. These harsh conditions destroy heat labile feed ingredients, such as medications, vaccines, growth promoters, vitamins, minerals and other nutrients that are advantageous, albeit necessary in many fish diets. For example, approximately 50% of vitamin C, 35% of vitamin A and 35% of thiamine are lost during commercial extrusion processing. Similar results occur for other fortifying agents during processing and storage. As a consequence, overfortification of labile nutrients in processed fish feed is currently necessary.

Efforts to provide a stable aquatic animal feed have been made. Gunter et al., U.S. Pat. No. 3,889,007 (issued Jun. 10, 1975) discloses a food composition for aquatic organisms and particularly crustaceans comprising fish meal and a fish extract, fish soluble, fish oil and a binder that may be an organic binder, such as gelatin, guar gum, agar, CMC alginate ester, collagen, and pregelatinized starch, and sea water. This feed still involves standard processing techniques, having the disadvantages of high temperatures and pressures.

Feed texture is also important for many aquatic animals. Commercially processed pelleted feed may be too hard as to be unpalatable to some fish and consequently be rejected by them. The hard pellets may also be so dense as to sink where they are not readily available to fish preferring floating feed. Conversely, the pellets may be so soft and friable that they disintegrate or dissolve too quickly. These feeds have the same disadvantages of meal feed, namely, poor feed conversion and decreased water quality due to increased growth of algae and aquatic vegetation.

Attempts have been made to increase the palatability of fish feed. For instance, Cox, U.S. Pat. No. 4,935,250 (issued Jun. 19, 1990) discloses increased palatability of fish feed pellets by coating preformed pellets with a coating of soft and flexible consistency that may be formed of alginate or guar gum set by calcium chloride solution or may incorporate gum tragacanth, pectin or gelatin.

Lastly, fishery and aquaculture management involves many different feed formulations to ensure that various types of fish are receiving proper nutrient requirements, texture and size. For instance, shrimp are particularly difficult to nourish adequately since they require a bottom (sunken) food and are raised mostly in closed water systems. As noted above, most finfish prefer floating type feed. With existing technology, a floating feed must contain starch in the feed mix to make it float. When the starch is subjected to high temperatures and pressures the starch will gleutinize or stick together. Then as the pressure on the starch is relieved, it expands trapping air in the feed. This trapped air makes the feed float. Feed produced in this way exposes the feed ingredients to high temperatures (above 220° C.) and pressures (8 atmospheres). These harsh conditions destroy heat labile feed ingredients. Presently, farmers must either purchase pre-formulated commercial feed, possessing the disadvantages outlined above or must have expensive processing equipment such as extrusion mills to formulate and produce their own feed. These are very costly limitations to the fisheries and aquaculture businesses.

The aquatic animal feed of the prior art embody one or more of the disadvantageous characteristics of instability in water, inadequate nutritional value, causation of poor water quality, poor palatability or costly processing. It would be of great value to the industry to provide an alternative feed and process for producing said feed which is free of the above-mentioned disadvantages. None of the prior art compositions or processes provide all of the desirable characteristics of the stable aquatic animal feed of the present invention.

SUMMARY OF THE INVENTION

The present invention serves to solve the problems of water instability, labile nutrient loss, poor palatability and costly processing by providing an ambient-temperature-process for making aquatic animal feed and the ambient-temperature-processed feed so produced, comprising (a) mixing alginate, feed ingredients and fresh water to make a slurry wherein said slurry comprises 0.5–10% alginate, and (b) at low temperatures, exposing said slurry to divalent cations, such as calcium, to form a water stable alginate gel, and (c) forming a water stable aquatic feed pellet. The present invention is compatible with typical least cost formulation practices.

Another aspect of the invention is the ambient-temperature process or feed so produced wherein said slurry further comprises one or more fortifying agents including vitamins, minerals, pigmentation aids, proteins, amino acids (natural or synthetic), fats, oils, flavorings, medicaments, and foam stabilizers.

A further aspect of the invention is the ambient-temperature process or feed so produced further comprising the step of whipping a controlled amount of air or nitrogen into said slurry produced by step (a) before exposing said slurry to said divalent cations, step (b), to impart a preselected specific density to said slurry, such that the pellets so produced have different buoyancy characteristics and can either float, sink or float-sink-float.

Thus it is an object of the present invention to provide an ambient-temperature-process which is easily adaptable to ensure preferable size and density of the feed, does not involve the disadvantageous processing with high temperatures and pressures of presently available commercial feed and does not require the use of expensive processing equipment. A further object of the invention is to provide the ambient-temperature-processed feed that is free of high temperature and pressure processing, water-stable and maintains proper nutrient and ingredient levels, thereby reducing the necessity of overfortification. Said ambient-temperature-processed feed could also be a useful means of administering heat-labile drugs and vaccines to aquatic animals. A further object of the invention is that the ambient-temperature-processed feed can be provided as preformulated and processed feed or as a dry-mix for easy, low cost on-site production.

DETAILED DESCRIPTION OF THE INVENTION

An ambient-temperature process for making aquatic animal feed and the ambient-temperature-processed feed so produced are provided according to the present invention, comprising (a) mixing alginate, feed ingredients and fresh water to make a slurry wherein said slurry comprises 0.5–10% alginate, and (b) exposing said slurry to divalent cations to form a water stable alginate gel, and (c) forming a water stable aquatic feed pellet.

The phrases "ambient-temperature-process" or "ambient-temperature-processed,, as used herein and in the claims mean the process carried out at low temperatures; that is between about 3° C. to 156° C. Freezing weakens the alginate slurry and extremely high temperatures degrade any heat labile ingredients.

The phrase "aquatic animal" as used herein and in the claims means any marine or fresh water organism, such as but not limited to: Haliotis sp., Salmo sp., Menidia sp., Plecoglossus sp., Hypophthalmichthys sp., Mylio sp., Oreochromis sp., Lepomis sp., Salvelinus sp., Schilbeades sp., Ictalurus sp., Oncorhynchus sp., Gadus sp., Cyprinus sp., Epinephelus sp., Archoplites sp., Sparus sp., Carassius sp., Ctenopharyngodon sp., Mugil sp., Poecilia sp., Melanogrammus sp., Merluccius sp., Clupea sp., Heteropneustes sp., Catla sp., Labeo sp., Scarus sp., Anguilla sp., Micropterus sp., Chanos sp., Misgurnus sp., Esox sp., Hippoglossoides sp., Xiphophorus sp., Pollachius sp., Sphoeroides sp., Pagellus sp., Rutilus sp., Anoplopoma sp., Morone sp., Raja sp., Katsuwonus sp., Channa sp., Longirostris sp., Acipenser sp., Xiphophorus sp., Scophthalmus sp., Coregonus sp., Pseudopleuronectes sp., Seriola sp., and Tilapia sp. Preferred aquatic animals are FOOD FISH: channel catfish, carp species, milk fish, tilapia, salmon species, trout species, and red fish; SPORT FISH: largemouth bass, bluegill, northern pike, walleye, yellow perch, small mouth bass, fathead minnow, shiners, shad species, trout species, and salmon species, and INVERTEBRATES: crab, crayfish, and shrimp species; and non-food fish used as pets in aquariums.

The term "alginate" as used herein and in the claims means a polysaccharide or polymannuronate and is intended to include hydrophilic, or water-loving derivatives of alginic acid, such as but not limited to alginic acid, sodium alginate, potassium, ammonium, or propylene glycol alginates, KELMAR, KELCO-GEL, KELTOSE, KELCOSOL, ALTO, ALMAN, ALLOID, ALLOSE, KELGIN, MINUS, and PROTANAL. Alginic acid is a natural colloidal polyuronic acid extracted from several types of seaweed, composed mainly of anhydrous β-D mannuronic acid residues linked together in the 1:4 position to form a long straight chain molecule. Without intending to limit the invention, and by theory only, it is thought that algin is changed by a reaction with calcium or other divalent cation from a water soluble algin to a water insoluble alginate gel. This gelling reaction occurs at low-temperatures allowing for the production of an ambient-temperature-processed feed. The firmness of the final feed pellet can be adjusted by the concentration of algin added to make the slurry. Generally a higher percentage of algin results in a firmer pellet. Preferred is the ambient-temperature-process or ambient-temperature-processed feed wherein said slurry comprises 1.5%–3% alginate.

The phrase "feed ingredients" as used herein and in the claims means any animal or vegetable material suitable to meet the nutritional needs of aquatic animals, such as a particular species' total protein requirements. Preferred feed ingredients are those selected to meet the least cost formulation practices of typical feed producers. The percent feed ingredients that can be added is dependent on the type of algin, feed ingredient, size of feed ingredient particle, and the concentration of algin in solution. In general, feed ingredients can be present in a quantity between about 0–90 weight percent. Preferably, feed ingredients comprise about 20–60 weight percent. Also preferred are feed ingredients that have been ground to a small particle size, such as a fine powder of 0.5–2 mm.

The phrase "animal material" means any portion of the body or remains of any animal, land or aquatic, suitable for aquatic animal feed. Such animal material may include, but is not limited to fats, tallow or oils, meat scrap, fish meat or meal, animal organs and glandular meal, poultry by-products meal, fish solubles, crab, shrimp or other crustacean meal, blood products, milk products, blood meal, meat and bone meal, poultry feather meal, casein, and other dried products as described in the Official Publication of the Association of American Feed Control Officials, which is hereby incorporated by reference in its entirety. By "fish meal" as used herein and in the claims, it is intended to include any feed product formed by the processing or raw marine materials, press cakes, press water, crab meal, shrimp meal, etc., and aqueous extract of marine materials.

The phrase "vegetable material" as used herein and in the claims means any proportion or component of a plant from unicellular or multicellular members of the plant kingdom. Such vegetable material may include, but is not limited to flour, meal, bran, grains, polishings, middlings, or solubles produced from any seeds, such as of rice, wheat, oats, millet, corn, rye, barley, peanuts, peas, kidney, lima, lentil, cotton, sunflower and soy beans; legumes or leafy plants, such as vetch, alfalfa, clover, spinach, and pea pods; stalk vegetables, such as corn, tomatoes, and green peppers; or root vegetables, such as carrots, turnips, beets, onions, and potatoes; molasses, brewer's grains, canola meal and other vegetable materials similarly defined by the Feed Control Association.

The phrase "least cost formulation" as used herein and in the claims refers to the practice of using feed ingredients that are the least expensive and currently available at the time of formulation but which will meet the protein content requirements of the total formulation. The present invention is compatible with least cost formulation practices, so that it is possible to use any conventional feed ingredient to achieve a specific nutritional goal in the fish feed so long as the total formulation meets the requirements of the present invention.

The phrase "fresh water" as used herein and in the claims refers to potable treated or untreated (well or spring) water, water from non-marine sources such as rivers, streams, lakes, well, municipal water that contains less than 0.5 parts per thousand salt.

The order of components listed in said mixing step (a) is not meant to be limiting. The present invention is intended to include mixing of components of step (a) in any order. For instance, alginate can be hydrated in fresh water to form a slurry to which fortifying agents and/or feed ingredients, either dry or pre-mixed with fresh water, can be added. Feed ingredients and fortifying agents can be mixed with fresh water, to which alginate can be added. Further, feed ingredients, fortifying agents and alginate can be pre-mixed as dry ingredients and then mixed with fresh water. Any other combination or permutation of addition sequences to form the slurry of step (a) are intended in this invention.

The term "exposing" as used herein and in the claims refers to any means of introducing a divalent cation solution to a slurry, the order of introduction is not meant to be limiting. Such introduction means may include, but is not limited to spraying, dropping, stirring, mixing, etc. For instance, said slurry can be sprayed into said divalent cation solution, such as a calcium bath. Conversely, said divalent cation solution can be introduced into said slurry. Without intending to be limiting, and by theory only, it is believed that when the feed slurry contacts the calcium bath, a reaction takes place that forms an ionic bond between the algin and the calcium. This causes a conformational change in the algin molecule pulling the hydrophilic group of the algin polymer into the calcium ion. This reaction forces the hydrophobic groups of alginate out and makes the gel insoluble in water, thus water stable.

The phrase "divalent cations" as used herein and in the claims includes beryllium, magnesium, calcium, strontium, iron, chromium, nickel, copper, zinc, potassium. The amount of divalent cations in the final preparation can be trace amounts or up to the solubility of the salt in water. Preferred is the ambient-temperature-process or feed so produced wherein said slurry is exposed to a solution comprising divalent cations. The phrase "solution comprising divalent cations" as used herein and in the claims refers to any liquid of fresh or sea water having divalent cations.

Most preferred are the above-mentioned ambient-temperature process and feed so produced wherein said divalent cation is calcium and is provided either in a solution comprising about 3% divalent cations or in sea water.

The phrase "marine water" or "sea water" as used herein and in the claims refers to water found in the basins of the world's seas, oceans, bays, estuaries and/or water that contains more than 3 parts per thousand salinity.

The amount of total water (fresh and/or sea water) in said ambient-temperature-processed feed of the present invention can be present in a quantity of between about 30 to 98 weight percent.

The phrase "water stable" as used herein and in the claims refers to a feed which is coherent and does not readily disintegrate in water for at least 7 days in laboratory conditions of 2 days in typical warm water pond aquaculture conditions.

The pellets of the invention can be formed by any conventional means known to one of ordinary skill in the art, such as slicing, chopping, spraying or low-pressure extruding at ambient-temperatures. Said forming step does not require the use of expensive processing equipment, such as a high pressure steam extruders, including Anderson or Whinger extruders, or high pressure friction type extruders including InstaPro extruders. At high enough divalent cation concentrations, pellets will form spontaneously when the feed slurry contacts the divalent cation.

Preferably, the present invention provides the above-mentioned ambient-temperature process wherein said slurry further comprises one or more fortifying agents including vitamins, minerals, pigmentation aids, proteins, natural or synthetic amino acids (natural or synthetic), fats, oils, flavorings, medicaments, antioxidants and foam stabilizers. Fortifying agents can be present in a quantity between about 0–88 weight percent of the total feed.

The phrase "fortifying agents" as used herein and in the claims means those nutrition supplementing and balancing agents, or those ingredients which add desirable texture, or those ingredients necessary to aid or maintain proper health of the animal or any other agent suitable for aquatic animal feed. Such fortifying agents include but are not limited to vitamins, minerals (such as phosphorous, selenium, iodine, zinc, copper, etc.), proteins, amino acids, fats, oils, flavorings, carotinoids and other pigmentation aids, medicaments (such as antibiotics, growth promoters or vaccines), and foam stabilizers (such as xanthine gum, soap, BENEFIBER, protein, casein, malted milk, milk proteins, albumin, ionic and non-ionic soaps, gelatin, food gums, and guar gum). Preferred amino acids are arginine, histidine, isoleucine, leucine, valine, lysine, phenylalanine, methionine, threonine and tryptophan.

More preferably, the present invention provides the above-mentioned ambient-temperature process further comprising the step of whipping a controlled amount of air or nitrogen into said slurry produced by step (a) before exposing said slurry to divalent cations step (b) to impart a preselected specific density to said pellet.

The term "whipping" as used herein and in the claims refers to the ordinary and customary definition and using any means to introduce air or a gas, such a oxygen or nitrogen, into the feed slurry to impart a particular specific density. The term is intended to include but is not limited to mixing, agitating, etc. The specific density of the feed can be adjusted, depending on the amount of air or gas whipped into the slurry, so that the feed has a buoyancy to enable it to float on the surface of the water, or may sink to the bottom of the tank, pond or pool. Also, the feed may be processed so that it has the ability to float-sink-float.

By theory only and not meant to be limiting, it is thought that when formulated at the correct density the feed will float-sink-float by the following mechanism. When the feed is first exposed to the divalent ion the reaction with the algin has not taken place through the entire feed particle. As the reaction takes place, the molecules of the polysaccharide are pulled closer together. Once the feed particles are pulled tight they squeeze out water from the pellet. This loss of water out of the pellet will increase the density of the pellet, making the feed sink. On the bottom the feed pellet will slowly rehydrate, thus decreasing the density and the pellet will refloat to the surface. The duration of each of the float-sink-float phase is dependent on the amount of: feed ingredients, algin, and air in feed.

Preferred is the ambient-temperature-processed feed that has a buoyancy to enable it to float, that is the pellet has a specific density of lass than 1 g/cm$^3$.

It is contemplated that a dry mix of feed ingredients, fortifying ingredients and alginate are provided to farmers, whereby a machine could draw fresh water from any source available, mix the dry ingredients into a slurry, then expose, such as but not limited to spray, drop or deposit, said slurry into a pond or seawater containing divalent cations thus forming a pellet.

The invention can be further illustrated by the following non-limitative examples. The components and specific ingredients are presented as being typical, and various modifications can be derived in view of the foregoing disclosure within the scope of the invention.

| FEED INGREDIENT | PERCENT |
|---|---|
| *EXAMPLE 1. COMPLETE FEED* | |
| FISH MEAL | 35 |
| CORN MEAL | 30 |
| ALGIN | 2 |
| COD LIVER OIL | 2 |
| VITAMIN PREMIX | 1 |
| WATER | 30 |
| *EXAMPLE 2. COMPLETE FEED* | |
| POULTRY BY PRODUCT MEAL | 35 |
| CORN MEAL | 30 |
| ALGIN | 2 |
| COD LIVER OIL | 2 |
| VITAMIN PREMIX | 1 |
| WATER | 30 |
| *EXAMPLE 3. HIGH PROTEIN FEED* | |
| FISH MEAL | 75 |
| WATER | 23 |
| ALGIN | 2 |
| *EXAMPLE 4. LOW PROTEIN FEED* | |
| Corn Meal | 75 |
| WATER | 23 |
| ALGIN | 2 |
| *EXAMPLE 5. HIGH LIPID FEED* | |
| Cod liver oil | 75 |
| WATER | 23 |
| ALGIN | 2 |
| *EXAMPLE 6. PALATABLE FEED* | |
| Fresh Cow liver | 80 |
| WATER | 21 |
| ALGIN | 2 |

The foregoing disclosure includes all the information deemed essential to enable those skilled in the art to practice the claimed invention. Various modifications of the invention in addition to those shown and described herein will be apparent to those skilled in the art from the foregoing description. Such modifications are also intended to fall within the scope of the appended claims.

What is claimed is:

1. An ambient-temperature process for making a water stable aquatic animal feed comprising:
   (a) mixing alginate, feed ingredients consisting essentially of one or more of vitamins, minerals, pigmentation aids, proteins, amino acids, fats, oils, flavorings, medicaments, and foam stabilizers and fresh water in ambient temperatures to make a slurry containing 0.5–10% alginate,
   (b) exposing said slurry to calcium in ambient temperatures to form a water stable alginate gel that holds said feed ingredients together, wherein said slurry contains 1.5–3% alginate, and
   (c) forming said slurry into pellets in ambient temperatures.

2. The ambient-temperature process of claim 1, further comprising the step of whipping a controlled amount of air or nitrogen into said slurry before exposing said slurry to said calcium to impart a preselected specific density to said pellet to enable said pellet to float.

3. The ambient-temperature process of claim 1, wherein said calcium is in solution, which contains about 3% calcium.

4. The ambient-temperature process of claim 1, wherein said calcium is in is sea water.

5. The ambient-temperature process of claim 1, wherein said alginate and said feed ingredients are first dry-mixed, then said dry-mix is mixed with said fresh water to form said slurry.

6. The ambient-temperature process of claim 1, wherein said alginate and fresh water are mixed to form a solution, then said solution is mixed with said feed ingredients to form said slurry.

7. The ambient-temperature process of claim 1, wherein said medicaments consists essentially of antibiotics, growth promoters or vaccines.

* * * * *